United States Patent [19]

Niimura

[11] Patent Number: 5,613,866

[45] Date of Patent: Mar. 25, 1997

[54] CARD RECEIVER ELECTRICALLY FOR CONTACTING A CARD MEDIUM HAVING A PLURALITY OF ELECTRICAL CONNECTING TERMINALS

[75] Inventor: Yuuji Niimura, Tokyo, Japan

[73] Assignee: Oki Electric Industry Co., Ltd., Tokyo, Japan

[21] Appl. No.: 397,199

[22] PCT Filed: Sep. 7, 1993

[86] PCT No.: PCT/JP93/01259

§ 371 Date: Mar. 7, 1995

§ 102(e) Date: Mar. 7, 1995

[87] PCT Pub. No.: WO94/06178

PCT Pub. Date: Mar. 17, 1994

[30] Foreign Application Priority Data

Sep. 8, 1992 [JP] Japan .................................... 4-239753

[51] Int. Cl.⁶ .................................................. H01R 13/15
[52] U.S. Cl. .................................................. 439/260; 439/326
[58] Field of Search .................................... 235/482, 483, 235/484, 485, 486; 439/260, 326, 261, 259, 341, 376

[56] References Cited

U.S. PATENT DOCUMENTS 4,279,459  7/1981  Sherman .................................. 439/325
4,843,221  6/1989  Ohtsuki et al. ......................... 235/482
4,864,116  9/1989  Banjo et al. ........................... 235/492
5,012,078  4/1991  Pernet ................................... 235/486

FOREIGN PATENT DOCUMENTS 58-77898    5/1983   Japan .
59-168981  11/1984   Japan .
60-11581    4/1985   Japan .
61-294780  12/1986   Japan .
4-4488      1/1992   Japan .
2198595     6/1988   United Kingdom .

Primary Examiner—Neil Abrams
Assistant Examiner—Barry Matthew L. Standig
Attorney, Agent, or Firm—Law Office of Steven M. Rabin

[57] ABSTRACT

An electrical connector for electrically connecting to a card medium having electrical connecting terminals. The electrical connector includes a case having a horizontal surface including opposite first and second sides, and an inclined surface including opposite third and fourth sides, wherein the fourth side is connected to the first side and the inclined surface is inclined so as to descend from the fourth side toward the third side. Supporting structure is provided opposite to the inclined surface for supporting contacts provided at the side thereof opposite to the inclined surface. A fixing structure is provided for fixing the card medium when the card medium is inserted between the inclined surface and the contacts in a state where the electrical connecting terminals contact the corresponding contacts.

24 Claims, 5 Drawing Sheets

PRIOR ART
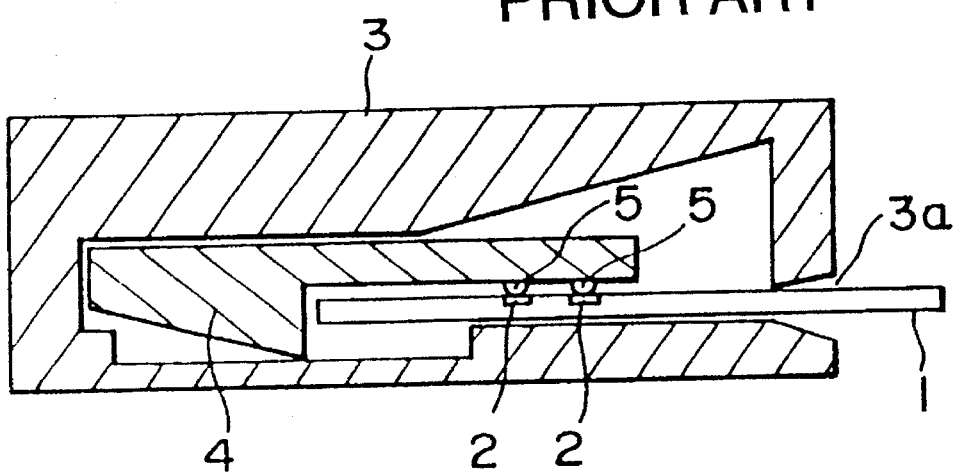
F I G. 2

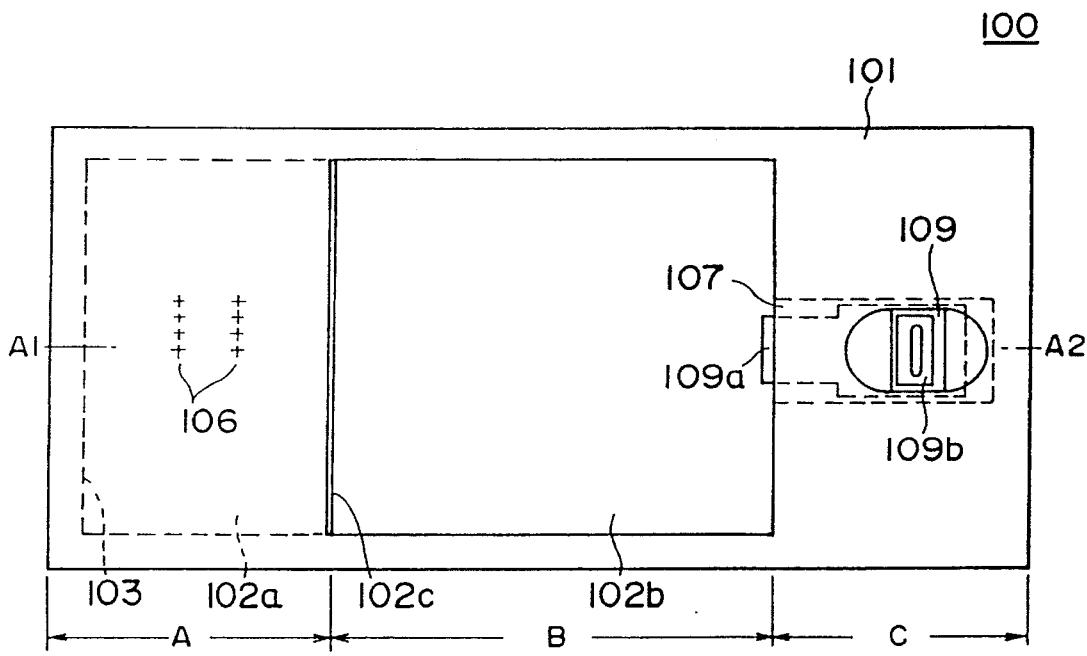
F I G. 3
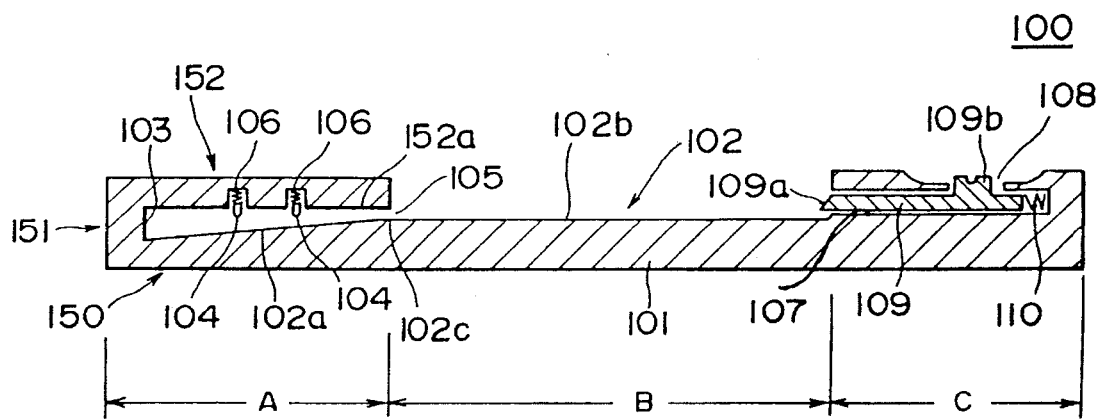
F I G. 4

CARD RECEIVER ELECTRICALLY FOR CONTACTING A CARD MEDIUM HAVING A PLURALITY OF ELECTRICAL CONNECTING TERMINALS

BACKGROUND OF THE INVENTION

1. Field of the Invention

The present invention relates to an electrical connector, particularly to a structure of an electrical connector adapted for use in a card medium such as an IC card, etc. having connecting terminals for electrically connecting to an external device.

2. Description of the Related Art

A card medium such as an IC card, etc. having connecting terminals for electrically connecting to an external device can write data in or read the data written in the IC card. Data is written and read using a card reader/writer. The card reader/writer has an electrical connector for electrically connecting to connecting terminals of the card medium. It is possible to electrically write data in the card medium or read the data from the card medium when the card medium is inserted into the card reader/writer so as to permit contacts of the electrical connector to contact the connecting terminals of the card medium. The card medium employs spring contacts as contacts so as to be fit for the frequent attachment and detachment thereof.

An electrical connector of this type is, for example, disclosed in Japanese Patent Publication No. 60-3234. A structure of this electrical connector is shown in FIG. 1.

In this prior art electrical connector, denoted at 1 is a card medium having electrical connecting terminals 2, denoted at 3 is a case having an insertion slot 3a through which the card medium 1 is inserted, denoted 4 is a clamping portion movably accommodated in the case 3 and denoted 5 is a contact attached to the clamping portion 4.

When the card medium 1 is inserted through the insertion slot 3a of the electrical connector and it is pushed toward the clamping portion 4, the clamping portion 4 is moved to the left and turned clockwise. When the clamping portion 4 is turned, the contacts 5 are lowered and connected to the connecting terminals 2 provided on the card medium 1. FIG. 2 shows a state where the contacts 5 of the electrical connector contact the corresponding connecting terminals 2 of the card medium. Since the contacts 5 have resiliency, they surely contact the connecting terminals 2 of the card medium 1 in a given pressure.

However, since the clamping portion 4 having the contacts 5 is movable in the prior art electrical connector having the aforementioned arrangement, there are the following problems. (A) The card medium 1 can not be smoothly inserted into or pulled out of the case 3 due to the friction which is generated when the clamping portion 4 is moved inside the case 3, (B) since the case 3 requires a space in which the clamping portion 4 is moved, it becomes large in a direction of inserting the card medium 1 and thick in a vertical direction, (C) since the contacts 5 are moved, it becomes complex to design the clamping portion 4 where the contacts 5 contact the corresponding connecting terminals 2 with assurance and the space where the clamping portion 4 is moved inside the case 3, (D) since the contacts 5 are moved, a method to electrically connect the contacts 5 with an internal circuit of the card reader/writer which is provided outside the case 3 becomes complex. Further, there is a problem in that (E) since the card medium 1 is inserted and pulled out in a state where the contacts 5 contact the connecting terminals 2 of the card medium 1 with a given pressure, the connecting terminals 2 of the card medium 1 are damaged.

The present invention has been made in view of the aforementioned problems, and it is an object of the invention to provide an electric connector wherein a card medium can be easily inserted and pulled out and a this case can be used. It is another object of the invention to provide an electrical connector wherein electrical connection between connecting terminals of a card medium, contacts and an internal circuit of a card reader/writer can be surely performed with a simple design. It is still another object of the invention to provide an electrical connector wherein the connecting terminals of the card medium are not damaged.

SUMMARY OF THE INVENTION

To achieve the above objects, in an electrical connector of the present invention for electrically connecting to a card medium having electrical connecting terminals, the electrical connector comprises a case having a horizontal surface including opposite first and second sides and an inclined surface including opposite third and fourth sides wherein the fourth side is connected to the first side and the inclined surface is inclined so as to descend from the fourth side toward the third side, a supporting means provided opposite to the inclined surface for supporting contacts provided at the side thereof opposite to the inclined surface, and a fixing means for fixing the card medium when the card medium is inserted between the inclined surface and the contacts in a state where the electrical connecting terminals contact the corresponding contacts.

BRIEF DESCRIPTION OF THE DRAWINGS

FIG. 2 is a side cross-sectional view of the structure of the prior art electrical connector showing a state where a card medium is inserted;

FIG. 3 is a plan view of an electrical connector according to a first embodiment of the invention;

FIG. 4 is a cross-sectional view of the electrical connector taken along lines A1–A2 of FIG. 3;

BEST MODE FOR CARRYING OUT THE INVENTION

Figure 1:
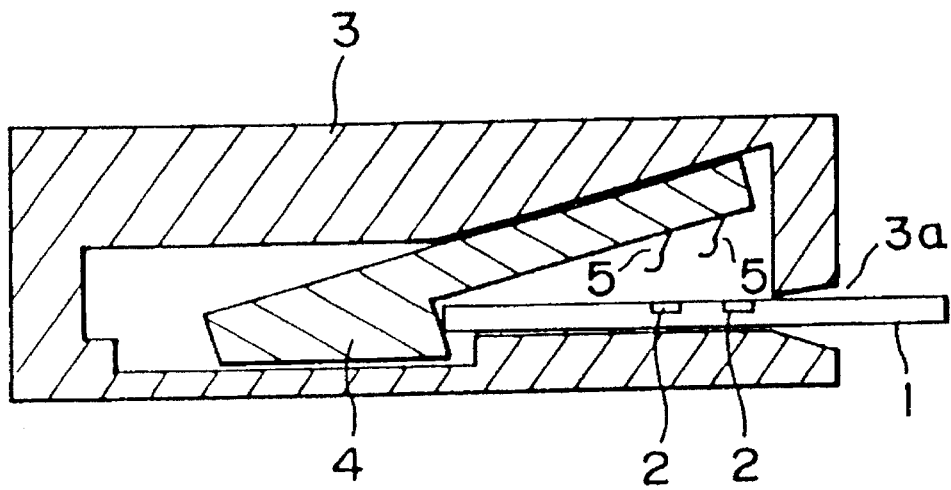
FIG. 1 is a side cross-sectional view showing a structure of a prior art electrical connector.

Embodiments of the present invention will now be described with reference to drawings.

FIG. 3 is a plan view of an electrical connector 100 according to a first embodiment of the invention and FIG. 4 is a cross-sectional view of the electric connector 100 taken along lines A1–A2 of FIG. 3.

Denoted at 101 is a case for fixing and holding a card medium. The case 101 is rectangular as viewed from the plan view of FIG. 3 and comprises an electrical connecting portion A for electrically connecting to connecting terminals of the card medium, a medium receiving portion B on which the card medium is placed a horizontal orientation, and a medium fixing portion C for fixing the card medium placed on the medium receiving portion B. The case 101 is larger than the card medium by about the size of the medium fixing portion C provided at the right or left side thereof in FIGS. 3 and 4.

A structure of the electrical connecting portion A will be first described.

The electrical connecting portion A has a substantially inverse U-shape as viewed from the side cross-sectional view of FIG. 4. The substantially inverse U-shape comprises a bottom portion 150 including an inclined surface 102a, a side portion 151 including a vertical wall 103 serving as a stopper of the inserted card medium, and an upper portion 152 for supporting contacts 104. The bottom portion 150, side portion 151 and the upper portion 152 are integrally formed with the case 101. The distance between a lower end portion 152a of the upper portion 152 and the bottom portion 150 at the side of the medium placing portion B is slightly greater than the thickness of the card medium, thereby forming an insertion slot 105. An inner space of the electric connecting portion A gradually widens from the insertion slot 105 toward the vertical wall 103 of the side portion 151 in the vertical direction in FIG. 4 due to the inclined surface 102a provided on the bottom portion 150. The contacts 104 formed on the upper portion 152 are made of a conductive material and they are given resiliency by springs 106 and project toward the inclined surface 102a. The resiliency is set to such an extent that an end portion of the card medium is permitted to barely float at the medium fixing portion C when the card medium is turned about a ridgeline 102c which is a boundary between the inclined surface 102a and the horizontal surface 102b and serves as a fulcrum. A stage 102 is formed by the inclined surface 102a and the horizontal surface 102b for turning the card medium 170 (See FIGS. 5(A)–5(D). There are provided plural contacts 104 (eight in FIG. 3) in plural rows correspondence with the terminals of the card medium 170. These plural contacts 104 are substantially the same in the amount of projection thereof, the amount of projection being to such an extent that the contacts 104 do not contact the connecting terminals of the card medium 170 when the card medium 170 is inserted into the electrical connecting portion A along the inclined surface 102a. A contact corresponding to a ground potential terminal for protecting the internal circuit of the card reader/writer is provided adjacent to the medium receiving portion B. The amount of projection of the ground contact alone corresponding to the ground potential terminal may be greater than that of the other contacts.

The medium receiving portion B will be now described.

The medium receiving portion B includes the horizontal surface 102b joined to the inclined surface 102a. The medium receiving portion B receives the card medium 170 on the horizontal surface 102b while permitting the former to be in surface contact with the latter when the connecting terminals of the card medium 170 contact the contact 104.

The medium fixing portion C will be now described.

The medium fixing portion C has a hole portion 107 which is open to the medium receiving portion B. The hole portion 107 is positioned at a portion higher than the horizontal surface 102b by a distance which is slightly larger than the thickness of the card medium 170. As viewed from the side cross-sectional view of FIG. 4, an opening 108 which joined to the hole portion 107 is formed on the upper portion of the case 101. There are provided in the hole 107 a medium fixing member 109 comprising a tapered retaining portion 109a which retains the card medium 170, and a projection 109b which is engaged with the opening 108 and projects therefrom. The medium fixing member 109 is urged by the spring 110 toward the medium receiving portion B. Since the projection 109b of the medium fixing member 109 is formed laterally more slender than the opening 108 in FIG. 4, the medium fixing member 109 is movable to the extent of the difference in size between the opening 108 and the projection 109b in the left- and rightward directions in FIG. 4. This difference may be set to such an extent that the card medium 170 can be fixed on the horizontal surface 102b of the medium receiving portion B while the former is in surface contact with the latter and it can be released from being fixed on the horizontal surface 102b.

An operation to insert the card medium 170 into or pulling it out from the electrical connector 100 will be now described. FIGS. 5(A) to 5(D) are views for explaining operations of inserting and pulling out the card medium, as viewed on cross section along lines A1–A2 of FIG. 3.

Figure 5A:
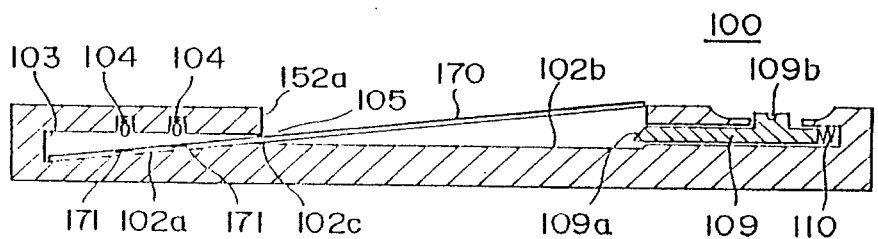
FIGS. 5(A) to 5(D) are views for explaining inserting and pulling out operations of the card medium as viewed from the cross-sectional view of the electrical connector taken along lines A1–A2 of FIG. 3.

First, the card medium 170 is inserted from the short side thereof through the insertion slot 105. At this time, a surface on which the connecting terminals 171 of the card medium 170 are provided is directed upward and then the card medium 170 is inserted so that the connecting terminals 171 contact the contacts 104. The card medium 170 is further inserted until it strikes against the vertical wall 103 along the inclined surface 102a. The card medium 170 is prevented from further being inserted, when it strikes against the vertical wall 103. This state is illustrated in FIG. 5(A). Another short side of the card medium 170 which is not inserted is positioned over the horizontal surface 102b and above an end of the medium fixing member 109. At this time, the connecting terminals 171 do not contact the contacts 104 in a state where the card medium 170 is placed along the inclined surface 102a (namely, in a state where the card medium 170 is supported by a hand).

Figure 5B:
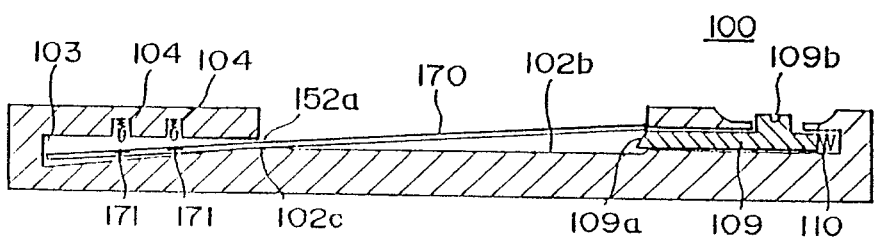

When the card medium 170 is completely inserted and it is released from the hand, it is turned clockwise about the ridgeline 102c that serve as a fulcrum. The turning of the card medium 170 stops when it is brought into contact with the upper portion of the retaining portion 109a of the medium fixing member 109. This state is illustrated in FIG. 5(B). At this time, the connecting terminals 171 do not yet contact the contacts 104.

Figure 5C:
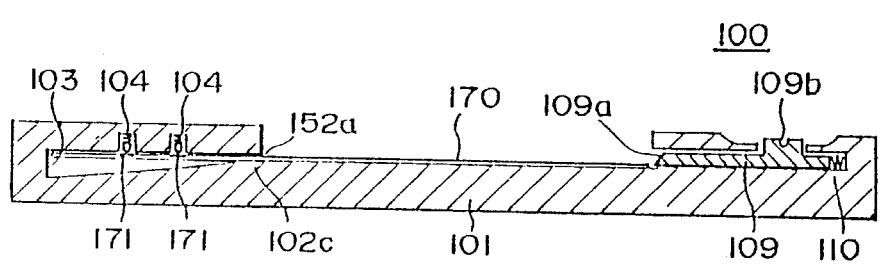

Successively, when the end of the card medium 170 at the side of the medium fixing member 109 is pressed downward, the medium fixing member 109 is moved rightward against the spring 110, as the right side of the card medium 170 moves along a tapered surface of the retaining portion 109a, namely, the medium fixing member is moved rightward in FIG. 5(B) as the card medium 170 is turned along the tapered portion of the retaining portion 109a. The inserted short side of the card medium 170 is moved upward as the card medium 170 is turned along the tapered surface of the retaining portion 109a. The connecting terminals 171 of the card medium 170 are moved and finally contact the contacts 104 as the inserted short side of the card medium 170 is moved upward. During the engagement of the connecting terminals 171 with the contacts 104, the right positioned contact 104 in FIG. 5(B) contacts the connecting terminal 171 earlier than the left-positioned contact 104 in FIG. 5(B). In this embodiment, the right positioned contact 104 corresponds to the ground potential connecting. However, if the ground potential connecting terminal of the card medium 170 were positioned at the left in FIG. 5(B), it would be enough to set the amount of projection of the left-positioned contact 104 in FIG. 5(B) to be greater than that of the right-positioned contact 104 so that the left positioned contact 104 first contacts the ground potential connecting terminal of the card medium 170. In such a case, when the left-positioned contact 104 contacts the ground potential connecting terminal, the other contacts 104 successively contact a corresponding power supply connecting terminal, a corresponding read/write connecting terminal, etc. The card medium 170 is turned until it is in surface contact with the horizontal surface 102b. In a state where the card medium 170 is in surface contact with the horizontal surface 102b, the connecting terminals 171 contact the corresponding contacts 104 with a given pressure force. This state is illustrated in FIG. 5(C). The card medium 170, which is in surface contact with the horizontal surface 102b, is released engagement with the tapered surface of the medium fixing member 109 and is positioned at the position shown in FIG. 5(C), where the medium fixing member 109 is provided. Accordingly, the medium fixing member 109 is moved to the left in FIG. 5(C) by the resiliency of the spring 110 and then returned to a given position. At this time, the retaining portion 109a of the medium fixing member 109 which projects over the horizontal surface 102b covers a part of the right short side of the card medium 170 in FIG. 5(C). This state is illustrated in FIG. 5(D).

Figure 5D:
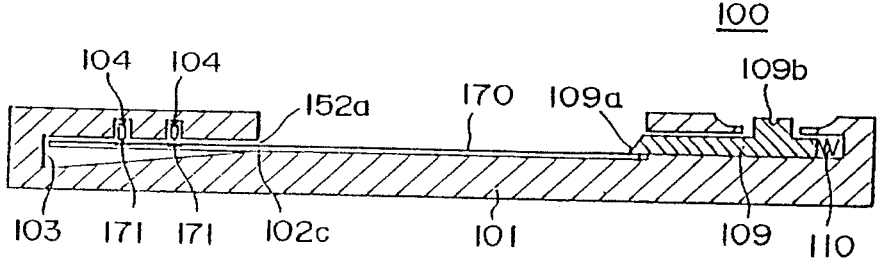

When the card medium 170 is pulled out from the electrical connector 100, the projection 109b of the medium fixing member 109 is moved to the right in FIG. 5(D) by a hand, thereby moving the medium fixing member 109 to the right. When the medium fixing member 109 is moved to the right, the retaining portion 109a no longer covers part of the card medium 170. Accordingly, the right short side of the card medium 170 in FIG. 5(D) is released from being fixed by the retaining portion 109a so that the left short side of the card medium 170 is pressed downward by the pressure force of the contacts 104. Since the card medium 170 is turned counterclockwise about the ridgeline 102c serving as the fulcrum, the right short side of the card medium 170 floats upward. In this state, the card medium 170 can be easily pulled out from the electrical connector 100.

Accordingly, in the first embodiment of the invention, the card medium 170 can be smoothly inserted into and pulled out from the electrical connector 100. Moreover, the electrical connector 100 can be relatively small in size since it requires only a space where the medium fixing member 109 can be provided in addition to the card medium 170 and a thickness which permits the card medium 170 to be slightly turned in the case. Further, since the contacts 104 are supported by the case 101 and there is no moving mechanism in the electrical connector 100 other than the medium fixing member 109, the electrical connector 100 can be easily designed and the contacts 104 and the internal circuit of the card reader/writer can be easily electrically connected. Still further, since the card medium 170 can be inserted into or pulled out from the electrical connector 100 in a state where the connecting terminals 171 of the card medium 170 and the contacts 104 do not receive any pressure, the connecting terminals 171 are prevented from being damaged. Still further, since the electrical connector 100 has a simple structure and few parts, it is hardly damaged, and there is no likelihood that the card medium 170 is prevented from being pulled out therfrom, if there is any trouble, etc. with the card reader/writer.

An electrical connector 200 according to a second embodiment of the invention will be now described.

Figure 6:
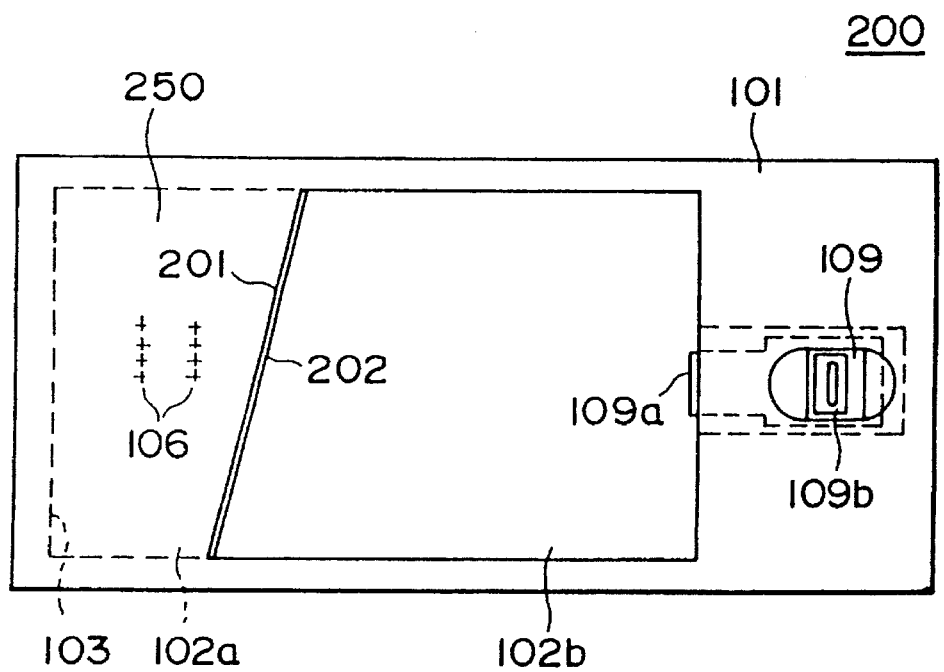
FIG. 6 is a plan view of an electrical connector according to a second embodiment of the invention.

FIG. 6 is a plan view of the electric connector 200 according to the second embodiment of the invention.

In the second embodiment, an upper portion 250, corresponding to the upper portion 152 of the first embodiment, has an inclined shape at the side 201 of an insertion slot and a ridgeline 202 is also inclined in conformity with the inclined shape of the side 201.

The operations of inserting and pulling out the card medium and causing contact between the connecting terminals of the card medium and the contacts, are the same as those of the first embodiment.

Accordingly, the electrical connector 200 of the second embodiment reduces the amount of material required for the case 101.

An electrical connector 300 according to a third embodiment of the invention will be now described.

Figure 7:
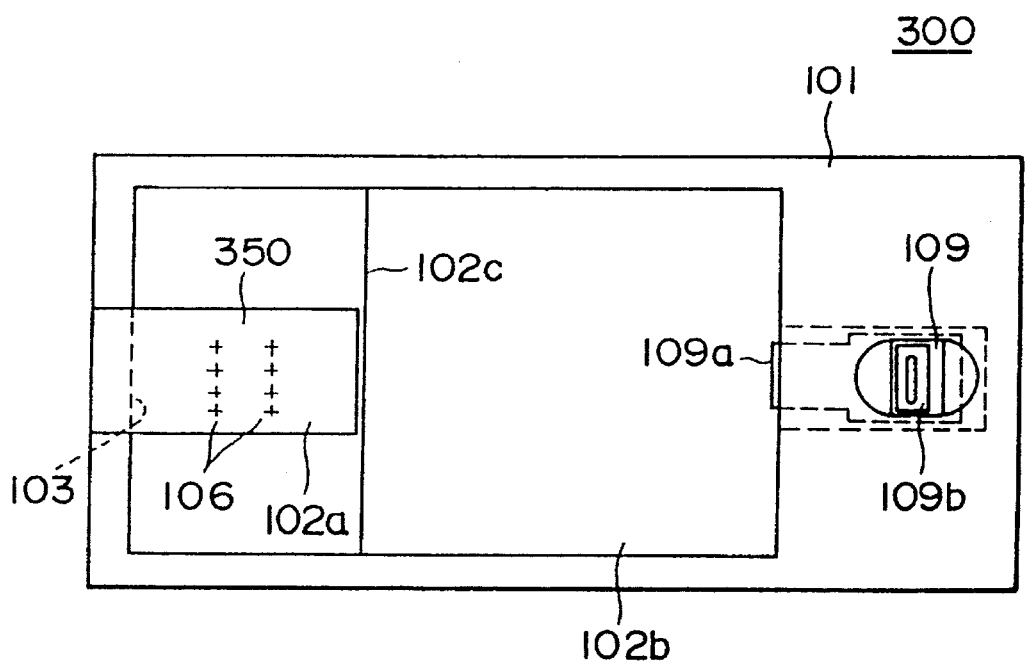
FIG. 7 is a plan view of an electrical connector according to a third embodiment of the invention.

FIG. 7 is a plan view of the electrical connector 300 according to the third embodiment of the invention.

In the third embodiment, an upper portion 350 corresponding to the upper portion 152 of the first embodiment is provided only at the portion where contacts 104 and springs 106 are supported thereby.

The operation of inserting and pulling out the card medium and causing contact between the connecting terminals of the card medium and the contacts 104 are the same as those of the first embodiment.

Accordingly, the electrical connector 300 of the third embodiment can reduce the amount of material of the case 101, as compared with the second embodiment and can always confirm data as indicated on the surface of the card medium.

An electrical connector 400 according to a fourth embodiment of the invention will be now described.

Figure 8:
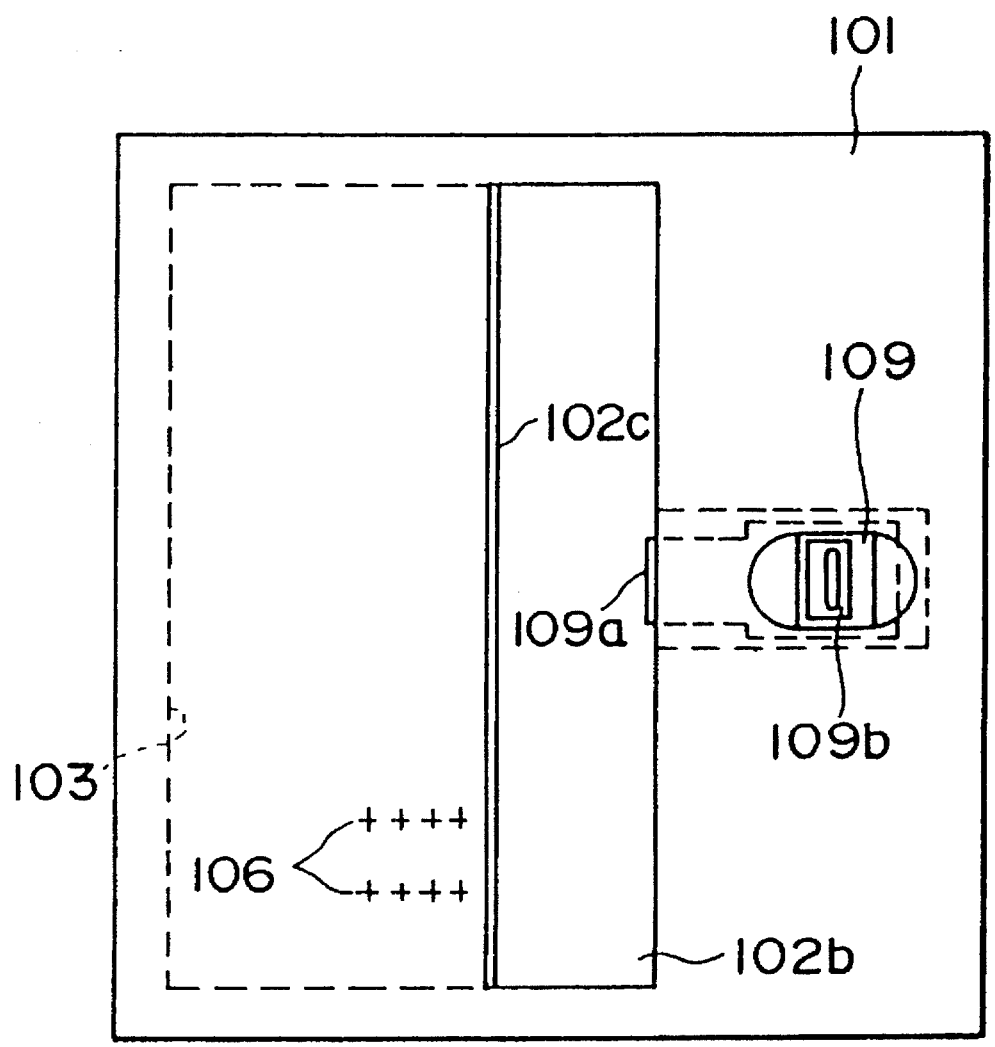
FIG. 8 is a plan view of an electric connector according to a fourth embodiment of the invention.

FIG. 8 is a plan view of the electrical connector 400 according to the fourth embodiment of the invention.

In the fourth embodiment, a long side of the card medium can be inserted into the electrical connector 400.

The operations of inserting and pulling out the card medium and causing between the connecting terminals of the card medium and the contacts 104 are the same as those of the first embodiment.

Accordingly, since the rectangular shape of the electrical connector 400 is made more approximate to a square, the electrical connector 400 is hardly bent.

The electrical connector of the present invention is not limited to the aforementioned embodiments.

For example, a spring can be provided on the horizontal surface and the card medium permitted to float by this spring.

The location of the ridgeline may be changed from the position described in the aforementioned embodiments to another position where the card medium is inserted through the insertion slot and the inserted card medium is turned about the ridgeline serving as the fulcrum.

Further, the amount of projection of the contacts may be differ from one to another.

Still further, the upper portion of the electrical connecting portion may have an embossing notched portion for discriminating two surfaces of the card medium.

As described in detail above, according to the present invention, it is possible to provide an electrical connector wherein a card medium can be easily inserted and pulled out and the case can be made thin.

Further, according to the present invention, it is possible to provide an electrical connector wherein electrical connection between connecting terminals of the card medium, contacts and the internal circuit of the card reader/writer, can be surely performed with a simple design.

Still further, according to the present invention, it is possible to provide an electrical connector wherein the connecting terminals of the card medium are not damaged.

What is claimed is:

1. A card receiver which electrically contacts a card medium having a plurality of electrical connecting terminals, the card receiver comprising:

a case having a horizontal surface and an inclined surface oriented so that the card medium forms an acute angle with said horizontal surface when the card medium is in contact with said inclined surface;

a plurality of electrical contacts;

supporting means, disposed opposite to said inclined surface at a position higher than said horizontal surface by a distance no less than a thickness of the card medium, for supporting said electrical contacts in opposition to said inclined surface;

elastic members disposed on said supporting means so as to urge said electrical contacts toward said inclined surface such that said electrical contacts are brought into contact with the electrical connecting terminals of the card medium when the card medium is shifted from a first state, in which the card medium is in surface contact with said inclined surface, to a second state, in which the card medium is in surface contact with said horizontal surface; and means for fixing the card medium on said horizontal surface in said second state, with said electrical contacts in contact with the electrical connecting terminals of the card medium.

2. A card receiver according to claim 1, wherein said case further comprises a vertical wall disposed adjacent said inclined surface, said vertical wall being perpendicular to said horizontal surface.

3. A card receiver according to claim 2, wherein said vertical wall supports said supporting means such that said supporting means is substantially parallel to said horizontal surface.

4. A card receiver according to claim 1, wherein said elastic members are conductive.

5. A card receiver according to claim 1, wherein said plurality of electrical contacts include ground electrical contacts and other electrical contacts for applying a ground potential, and wherein said ground electrical contacts project further toward said inclined surface than do said other electrical contacts.

6. A card receiver according to claim 1, wherein said plurality of electrical contacts are arranged in a plurality of rows, wherein said plurality of electrical contacts include ground electrical contacts for applying a ground potential.

7. A card receiver according to claim 1, wherein said fixing means includes a fixing member disposed adjacent to said horizontal surface, and wherein said fixing member is disposed at a position higher than said horizontal surface by an amount no less than the thickness of the card medium and is horizontally movable, and wherein said fixing means further includes a spring means for urging said fixing member toward said inclined surface.

8. A card receiver according to claim 7, wherein said fixing member comprises an inclined portion which is inclined so as to descend toward said horizontal surface in a direction toward said inclined surface, a retaining portion for projecting over said horizontal surface, and a projection which engages a portion of said case to limit horizontal movement of said fixing member.

9. A card receiver according to claim 1, wherein said supporting means overlies the entirety of said inclined surface.

10. A card receiver according to claim 1, wherein said supporting means overlies only a part of said inclined surface.

11. A card receiver according to claim 1, wherein said horizontal surface has a surface area size such that when the card medium is in surface contact with said horizontal surface, a portion of the horizontal surface remains exposed.

12. A card receiver for electrically contacting a card medium having a plurality of electrical connecting terminals, the card receiver comprising:

a case comprising a stage for receiving the card medium thereon, said stage including a first area and a second area contiguously disposed to a first side of said first area, said first area having a horizontal surface and said second area having an inclined surface, said horizontal surface forming an acute angle with the card medium when the card medium is in contact with said inclined surface;

a plurality of electrical contacts;

a supporting member disposed opposite said inclined surface at a position higher than said horizontal surface by a distance no less than a thickness of the card medium, for supporting said plurality of electrical contacts in opposition to said inclined surface;

elastic members disposed on said supporting member so as to urge said electrical contacts toward said inclined surface, wherein said electrical contacts electrically contact said electrical connecting terminals as the card medium is shifted from a first state to a second state, wherein the card medium is in the first state when a surface of the card medium is substantially parallel with said inclined surface, and wherein the card medium is in the second state when a surface of the card medium is substantially parallel with said horizontal surface; and a fixing member for fixing the card medium on said horizontal surface in said second state, said fixing member being contiguously disposed to a second side of said first area, said fixing member being movable in a horizontal direction and including a projection disposed above said horizontal surface for fixing the card medium in the second state.

13. A card receiver according to claim 12, wherein said case further comprises a vertical wall disposed adjacent to said inclined surface, said vertical wall being perpendicular to said horizontal surface.

14. A card receiver according to claim 13, wherein said vertical wall supports said supporting means such that said supporting means is substantially parallel to said horizontal surface.

15. A card receiver according to claim 12, wherein said elastic members are electrically conductive.

16. A card receiver according to claim 12, wherein said plurality of electrical contacts include ground electrical contacts and other electrical contacts, for applying a ground potential, and wherein said ground electrical contacts project further toward said inclined surface than do said other electrical contacts.

17. A card receiver according to claim 12, further comprising a spring member for urging said fixing member toward said inclined surface.

18. A card receiver according to claim 17, wherein said fixing member comprises an inclined portion, a retaining portion, and a projection portion, said inclined portion being inclined so as to descend toward said horizontal surface in a direction toward said inclined surface, said retaining portion being disposed to project over said horizontal surface when said fixing member is moved horizontally toward said inclined surface, and said projection engaging said case to limit horizontal movement of said fixing member.

19. A card receiver according to claim 12, wherein said supporting member overlies the entirety of said inclined surface.

20. A card receiver according to claim 12, wherein said supporting member overlies a part of said inclined surface.

21. A card receiver according to claim 12, wherein said horizontal surface has a surface area size such that when said card medium is in surface contact with said horizontal surface, a portion of the horizontal surface remains exposed.

22. A card receiver for receiving a card medium having a connecting terminal, the card receiver comprising:

a case having a first surface and a second surface inclined with respect to said first surface, the second surface being oriented such that the card medium forms an acute angle with said first surface when the card medium is in contact with said second surface;

an electrical connector;

supporting means, disposed opposite to said second surface, for supporting said electrical connector in opposition to said second surface; and an elastic member, disposed on said supporting means so as to urge said electrical connector toward said inclined surface, such that said electrical connector is brought into contact with the connecting terminal as the card medium is moved from a first state, in which the card medium is flush with said second surface, to a second state, in which the card medium is flush with said first surface;

wherein said supporting means is disposed such that said electrical connector is not in contact with the connecting terminal when the card medium is in the first state and further such that the card medium is not in contact with said supporting means when the card medium is in the second state.

23. A card receiver according to claim 22, wherein said supporting means is arranged such that said electrical connector makes non-sliding contact with the connecting terminal when the card medium is moved from the first state to the second state.

24. A card receiver according to claim 22, further comprising means for fixing the card medium on said first surface and in said second state.

* * * * *